US009632541B2

(12) United States Patent
Xin et al.

(10) Patent No.: US 9,632,541 B2
(45) Date of Patent: Apr. 25, 2017

(54) CONNECTING DEVICE AND ELECTRONIC APPARATUS

(71) Applicant: Lenovo (Beijing) Co., Ltd., Beijing (CN)

(72) Inventors: Zhifeng Xin, Beijing (CN); Xiaosong Xia, Beijing (CN); Jun Xu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/838,533

(22) Filed: Aug. 28, 2015

(65) Prior Publication Data

US 2016/0342180 A1   Nov. 24, 2016

(30) Foreign Application Priority Data

May 21, 2015   (CN) .................. 2015 2 0334327 U
Jul. 21, 2015   (CN) ......................... 2015 1 0432351

(51) Int. Cl.
*E05D 1/00*    (2006.01)
*G06F 1/16*    (2006.01)

(52) U.S. Cl.
CPC .......... *G06F 1/1681* (2013.01); *G06F 1/1616* (2013.01)

(58) Field of Classification Search
CPC ............... Y10T 16/547; Y10T 16/5474; Y10T 16/5475; Y10T 16/541; Y10T 16/533;
(Continued)

(56) References Cited

U.S. PATENT DOCUMENTS 2,705,337 A * 4/1955 Langdon .................. E05F 1/10
16/66
2,910,741 A * 11/1959 Dettman ................. E06B 7/367
16/250
(Continued)

FOREIGN PATENT DOCUMENTS

DE          88 09 290 U1    9/1988
DE   20 2008 004 536 U1    7/2008
(Continued)

OTHER PUBLICATIONS

Office Action dated May 9, 2016 out of corresponding German application No. 102015116127.3 (11 pages including English translation).

*Primary Examiner* — Chuck Mah
(74) *Attorney, Agent, or Firm* — Brinks Gilson & Lione; G. Peter Nichols (57) ABSTRACT

The present disclosure provides a connecting device and an electronic apparatus having the same, which overcome the above deficiencies in related art, by using the connecting device, no matter where the rotating mechanism is rotated, the enclosing mechanism enclosing the outside of the rotating mechanism will always fit onto the rotating mechanism without any wrinkles or rig marks occur. A connecting device for rotatably connecting a first and a second bodies includes a rotating mechanism for rotationally connecting the first body and the second body together, wherein the connecting device further comprises an enclosing mechanism to enclose and cover at least a part of the rotating mechanism. The enclosing mechanism is attached to the first body and the second body respectively, and the degree of tightness of the enclosing mechanism varyies with the rotation of the rotating mechanism.

18 Claims, 8 Drawing Sheets

(58) Field of Classification Search
CPC ... Y10T 16/5335; G06F 1/1618; G06F 1/168; G06F 1/1681; G06F 1/1616; G06F 1/547; E05Y 2900/602; E05Y 2900/606; E05Y 2201/10; E05Y 2201/11; H04M 1/022; E05D 3/12; E05D 3/122; E05D 11/0054; E05D 11/0072; E05D 11/06
See application file for complete search history.

(56) References Cited

U.S. PATENT DOCUMENTS

| | | | | |
|---|---|---|---|---|
| 3,019,486 | A * | 2/1962 | Stinson | B29C 53/063 135/909 |
| 4,261,140 | A * | 4/1981 | McLean | E05F 5/04 16/83 |
| 4,856,141 | A * | 8/1989 | Sassenberg | E05D 5/08 16/250 |
| 4,946,217 | A * | 8/1990 | Steffens | B60J 7/041 16/251 |
| 5,001,862 | A * | 3/1991 | Albenda | E06B 7/367 16/251 |
| 5,432,676 | A * | 7/1995 | Satoh | G06F 1/1616 16/223 |
| 6,272,324 | B1 * | 8/2001 | Rudisill | H04M 1/0216 379/433.13 |
| 7,032,984 | B2 * | 4/2006 | Kim | G06F 1/1601 312/223.2 |
| 7,694,915 | B2 * | 4/2010 | Mindermann | B64C 1/14 244/130 |
| 7,836,635 | B2 * | 11/2010 | Webb | E06B 7/367 49/384 |
| 8,170,630 | B2 * | 5/2012 | Murayama | H04M 1/022 16/330 |
| 8,549,710 | B2 | 10/2013 | Novin | |
| 8,732,907 | B2 | 5/2014 | Novin | |
| 9,244,496 | B2 | 1/2016 | Sharma | |
| 9,395,762 | B2 | 7/2016 | Sharma | |
| 2004/0266502 | A1 * | 12/2004 | Holtorf | B32B 3/04 455/899 |
| 2010/0321882 | A1 | 12/2010 | Tracy | |
| 2011/0047750 | A1 | 3/2011 | Novin | |
| 2012/0176736 | A1 * | 7/2012 | Apgar | B32B 25/10 361/679.01 |
| 2013/0219663 | A1 * | 8/2013 | Cai | G06F 1/1681 16/371 |
| 2014/0026363 | A1 | 1/2014 | Novin | |
| 2014/0196253 | A1 * | 7/2014 | Song | G06F 1/1601 16/225 |
| 2014/0196254 | A1 * | 7/2014 | Song | E05D 3/14 16/302 |
| 2014/0217875 | A1 * | 8/2014 | Park | H05K 5/0226 312/326 |
| 2014/0226275 | A1 * | 8/2014 | Ko | G06F 1/1626 361/679.27 |
| 2014/0285960 | A1 | 9/2014 | Sharma | |
| 2015/0040349 | A1 * | 2/2015 | Malia | B29C 66/71 16/225 |
| 2015/0121654 | A1 | 5/2015 | Novin | |
| 2015/0277506 | A1 * | 10/2015 | Cheah | G06F 1/1681 361/679.27 |
| 2016/0091935 | A1 | 3/2016 | Sharma | |
| 2016/0187935 | A1 * | 6/2016 | Tazbaz | G06F 1/1681 361/679.03 |

FOREIGN PATENT DOCUMENTS

| | | |
|---|---|---|
| DE | 11 2008 003 795 | 2/2011 |
| DE | 11 2010 003 488 | 10/2012 |
| DE | 11 2012 006 392 | 3/2015 |
| DE | 10 2014 115 661 | 5/2015 |

* cited by examiner

CONNECTING DEVICE AND ELECTRONIC APPARATUS

This application claims priority to Chinese patent application No. 201510432351.4 filed on Jul. 21, 2015, and to Chinese patent application No. 201520334327.2 filed on May 21, 2015, the entire contents of which are incorporated herein by reference.

BACKGROUND

The present disclosure relates to a connecting device and an electronic apparatus having the same, and particularly, the connecting device may prevent the material of its comprised enclosing mechanism from generating wrinkle or rig marks when curvature occurs.

Existing electronic apparatuses, such as the laptop computer, the panel computer, are usually divided into two parts, one is the display, the other is the host computer, the display may arbitrarily rotate around the host computer and stay at any desired position, the display is commonly coupled with the host computer through articulation connection. For the sake of maintaining an esthetic appearance, some of the electronic apparatuses would use enclosing materials to shield the articulation point, so as to prevent the articulation point, for example, the articulation connector, from exposing and influencing the entire appearance of the electronic apparatus.

But, the used enclosing material would rotate with the display during the rotation of the display, assuming different states in which the enclosing material is unlikely to completely fit to the articulation point. When the enclosing material does not fit to the articulation point, wrinkle may occur inwardly and thus influence esthetic appearance.

Figure 1:
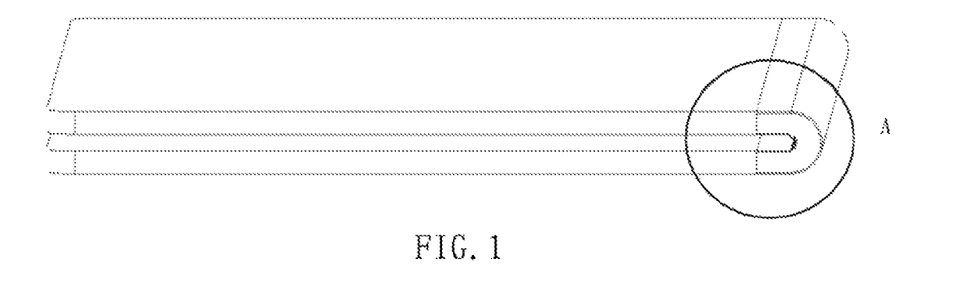
FIG. 1 is a schematic view of the electronic apparatus in related art when being closed.
Figure 2:
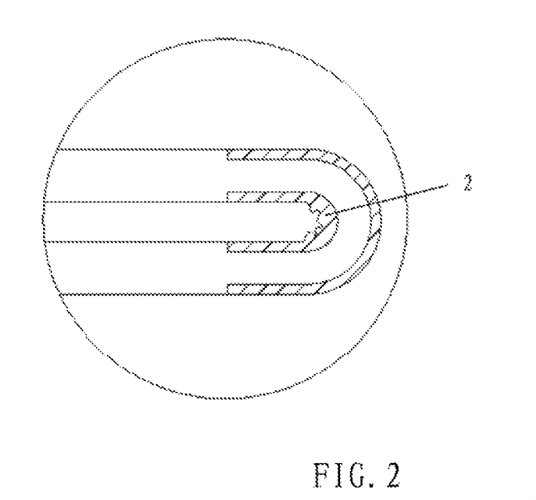
FIG. 2 is an enlarge sectional view of the part A of FIG. 1.

As shown in FIGS. 1 and 2, when existing electronic apparatuses are closed so as to make the display and the keyboard opposite to and parallel with each other, the enclosing material enclosing the rotating mechanism at inner side would occur wrinkles 2.

SUMMARY

The present disclosure provides a connecting device, which overcomes the above deficiencies in related art, by using the connecting device, no matter where the rotating mechanism is rotated, the enclosing mechanism enclosing the outside of the rotating mechanism would fit to the rotating mechanism without any wrinkles or rig marks occur.

The technical solution for the connecting device according to the present disclosure is a connecting device for rotatably connecting between a first body and a second body, the connecting device comprises a rotating mechanism for rotationally connecting the first body and the second body together, wherein the connecting device further comprises an enclosing mechanism to enclose and cover at least a part of the rotating mechanism, the enclosing mechanism being attached to the first body and the second body, and a tightness degree of the enclosing mechanism varying with the rotation of the rotating mechanism.

BRIEF DESCRIPTION OF THE DRAWINGS

Further advantages and characteristics of the present disclosure will become even more apparent from the following specific embodiments of the present disclosure given only by way of unrestricting examples and illustrated in the drawings, in which:

FIG. 4 is a schematic view of the electronic apparatus according to the present disclosure on a whole, wherein the enclosing mechanism and the rotating mechanism being cut through;

DETAILED DESCRIPTION

An introduction in detail will be made to the connecting device and electronic apparatus according to the embodiment of present disclosure in conjunction with FIGS. 3-8.

Please note that in the disclosure, in all embodiments, the word "enclose", "enclosing" can be interpreted as "cover", "covering". "Enclose" means "cover and fit".

Figure 3:
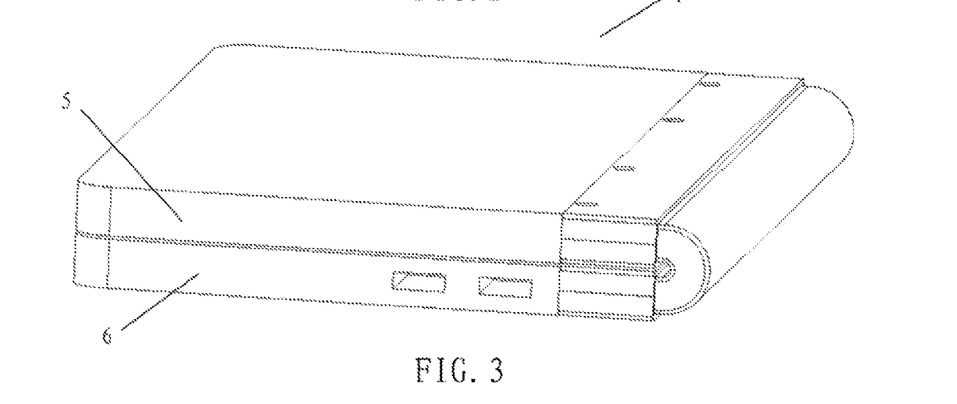
FIG. 3 is a schematic view of the electronic apparatus according to the present disclosure on a whole.
Figure 4:
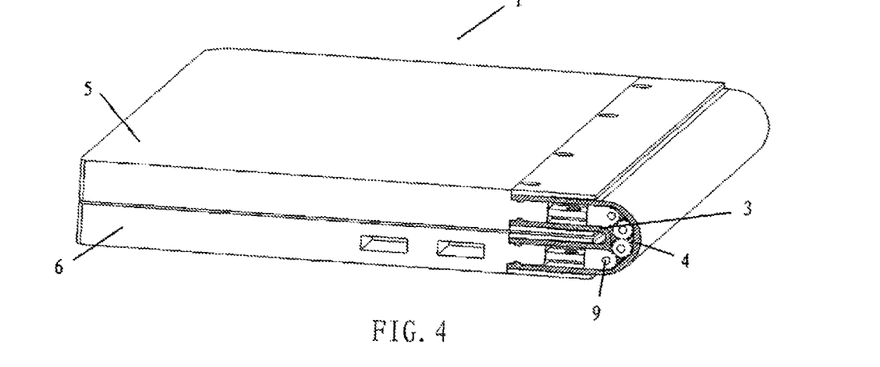

FIGS. 3 and 4 illustrate the electronic apparatus 1 according to the present disclosure. It can be seen clearly from FIGS. 3 and 4 that, the connecting device according to the present disclosure being employed, when the first body 5 and the second body 6 of the electronic apparatus 1 is closed opposite to each other, the enclosing mechanism does not occur wrinkles during the rotating mechanism enclosed by the enclosing mechanism rotates. The enclosing mechanism always fits to the rotating mechanism 9 completely.

Figure 5:
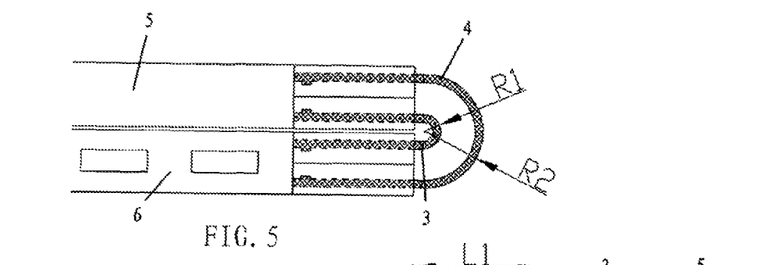
FIGS. 5 and 6 are schematic views of the enclosing mechanism of the connecting device according to the present disclosure, respectively wherein the first body and the second body are closed so as to be opposite to and parallel with each other, and wherein the first body and the second body are opened so as to form an intersection angle of 180°.
Figure 6:
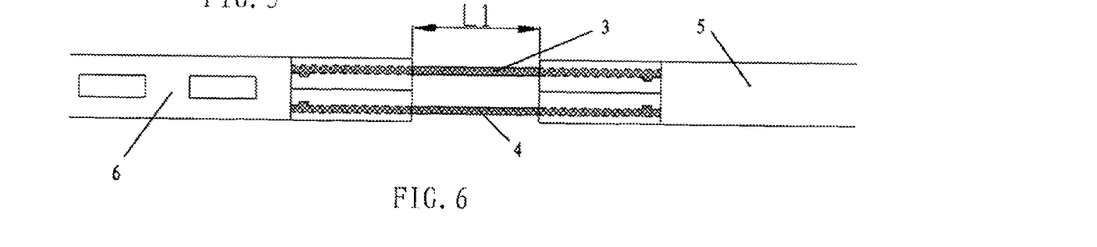

FIGS. 3-6 illustrate a connecting device for a rotatably connecting a first body 5 and a second body 6, the connecting device comprises a rotating mechanism 9 for rotationally connecting the first body 5 and the second body 6 together, the connecting device further comprises an enclosing mechanism to enclose and cover the rotating mechanism, the enclosing mechanism being attached to the first body 5 and the second body 6 respectively, and a tightness degree of the enclosing mechanism varying with the rotation of the rotating mechanism. The enclosing mechanism comprises a first enclosing piece 3 enclosing the first side of the rotating mechanism 9, i.e., the left side of FIGS. 4 and 5, and with the rotating mechanism 9 rotating, the connecting device has a first state, in which the first side of the rotating mechanism is located within the intersection angle between the first body and the second body (in the first state, in which the first body 5 and the second body 6 is located at an optional position from the closed state as shown in FIG. 3 to open to an intersection angle of 180° as shown in FIG. 6), and a second state, in which the first side of the rotating mechanism is located out of the intersection angle between the first body and the second body (in the second state, the first body 5 and the second body 6 is located at an optional position from opening to an intersection angle of 180° as shown in FIG. 6 downward to the position where an maximal intersection angle can be achieved by rotating the first body 5 and the second body 6).

When the connecting device is in the first state, the tightness degree of the first enclosing piece 3 is looser than the tightness degree of the first enclosing piece 3 when the connecting device is in the second state, since when the first enclosing piece 3 is in the first state, its extension range is small so as to always fit to the rotating mechanism, thus its tightness degree is adjustable.

The enclosing mechanism further comprises a second enclosing piece 4 enclosing the second side of the rotating mechanism opposite to the second side, i.e., the right side of FIGS. 4 and 5, when the connecting device being in the first state, the second side is located out of the intersection angle between the first body and the second body, and when the connecting device being in the second state, the second side is located within the intersection angle between the first body and the second body.

When the connecting device is in the first state, the second enclosing piece has a third tightness degree, when the connecting device is in the second state, the second enclosing piece has a fourth tightness degree, the third tightness degree being tighter than the fourth tightness degree, due to the fact that, when the second enclosing piece 4 is in the first state, its extension range is larger so that it can always fit to the rotating mechanism, therefore its tightness degree is adjustable.

To adapt different tightness degree, the enclosing mechanism is prestretched before being attached to the first body and the second body, so as to have a preset tightness degree such that in the state as shown in FIG. 5, the first enclosing piece 3 would not occur wrinkles or rig marks.

The first enclosing piece and the second enclosing piece need to be prestretched a certain value during the assemble process, the theoretical stretch value is $L=L1-\pi R1$; but actual stretch value is ensured to have its variation $\Delta: \pi R2 < \Delta < \pi R1$ according to different stretch materials. Wherein:

R1=minimum radius;
R2=maximum radius;
L1=the dimension of the material being stretched to 180°;
L=stretch value. (see FIGS. 5 and 6)

Generally, the material for the enclosing mechanism is silica gel, so as to ensure that the enclosing mechanism is stretchable and has a certain resilience and flexibility.

Figure 7:
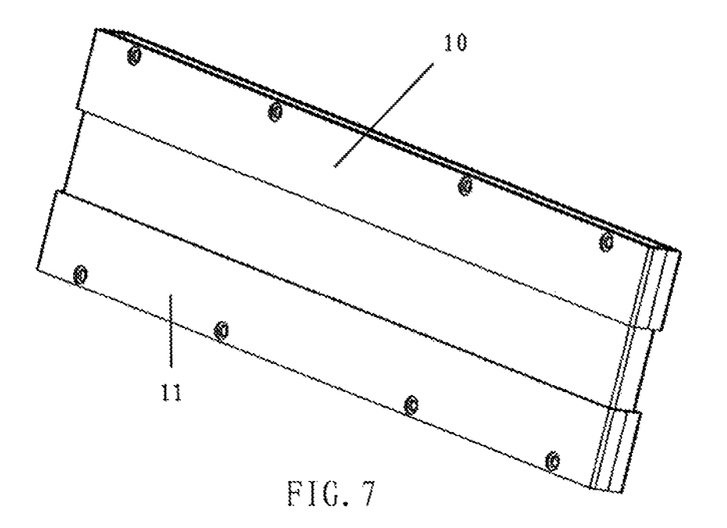
FIG. 7 is a schematic view of the cover and the enclosing mechanism.
Figure 8:
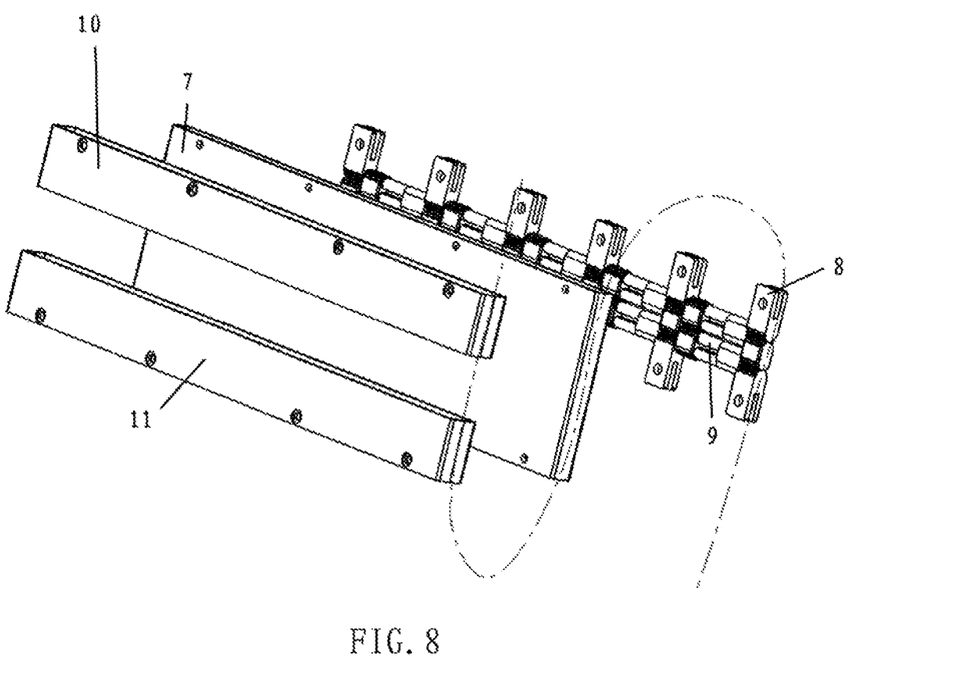
FIG. 8 is a schematic view of the covers, the enclosing mechanism and the rotating mechanism.

FIGS. 7 and 8 show a cover and the connecting manner between the enclosing mechanism and the rotating mechanism, which is one of the specific embodiments of the present disclosure and given by way of example only. The connecting device further comprises covers 10, 11 to attach the enclosing mechanism 7 onto the first body and the second body, the enclosing mechanism 7 is implemented with two pockets, the opposite end faces thereof being open, the enclosing mechanism 7 fitting over the outer side of the rotating mechanism 9, and there are two covers 10, 11 each implemented with two cuboids, the opposite end faces thereof being open, the two covers 10, 11 are fitted over the outer side of the two open ends of the enclosing mechanism, wherein the covers 10, 11, the enclosing mechanism 7 and the rotating mechanism 9 are provided with corresponding screw holes. The enclosing mechanism 7 and the rotating mechanism 9 are attached together by threading screw elements into the screw holes.

To press the enclosing mechanism tightly onto the rotating mechanism while forcing the enclosing mechanism evenly, the inner side of the cover may be provided with raised strips extending along its entire longitudinal direction; or the outer side of the enclosing mechanism may be provided with raised strips extending along its entire longitudinal direction, and the inner side of the cover is provided with recess cooperating with the raised strips, or the outer side of the enclosing mechanism may be provided with recess extending along its entire longitudinal direction and the inner side of the cover is provided with raised strips cooperating with the recess.

The rotating mechanism illustrated in the embodiment of present disclosure is a multi-spindle rotating mechanism having a plurality of connection taps 8 protruding outward in the radial direction of the spindles, the screw holes of the rotating mechanism are provided on the connection taps 8, and the connection taps 8 of the rotating mechanism are also used for connecting the first body and the second body in addition to the connection of the rotating mechanism to the enclosing mechanism and the covers, in such a way that the enclosing mechanism is attached to the first body and the second body.

With such a connecting device, no matter where the rotating mechanism is rotated, the enclosing mechanism enclosing the outside of the rotating mechanism will always fit to the rotating mechanism, no wrinkles or rig marks would occur.

The electronic apparatus of the present disclosure may be a laptop computer having a display device, a host computer and an input unit, the first body is the display device of the electronic apparatus, and the second body is the input unit and host computer of the electronic apparatus.

The electronic apparatus of the present disclosure may also be a panel computer, the first body is a display, the second body is the host computer, or the first body is a display and the host computer, the second body is the bracket plate.

When a laptop computer and panel computer employ the connecting device according to the present disclosure, the enclosing mechanism enclosing the outside of the rotating mechanism may fit to the rotating mechanism while the laptop computer or panel computer stays at any desired service position or closed position, no wrinkles or rig marks would occur.

An introduction in detail will be made to the connecting device and electronic apparatus according to further embodiments of present disclosure in conjunction with FIGS. 9-17.

Figure 9:
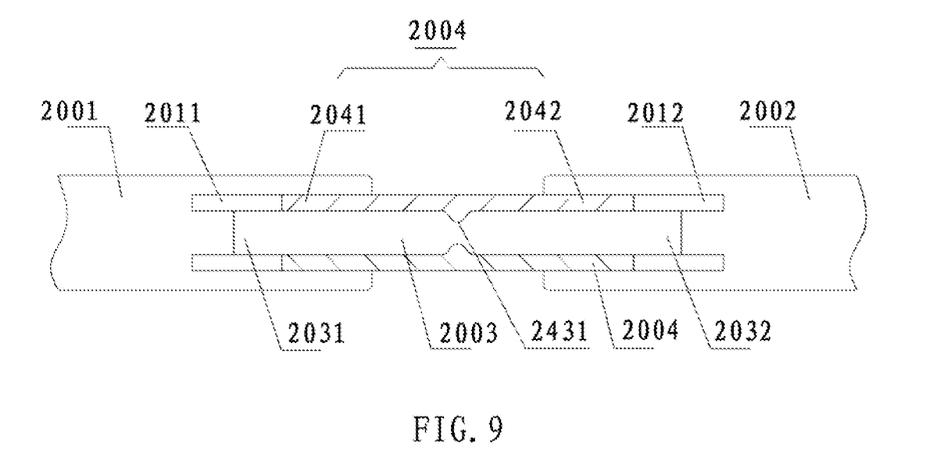
FIG. 9 is a partial sectional structural schematic view of an electronic apparatus having a connecting device according to the present disclosure when being opened.
Figure 10:
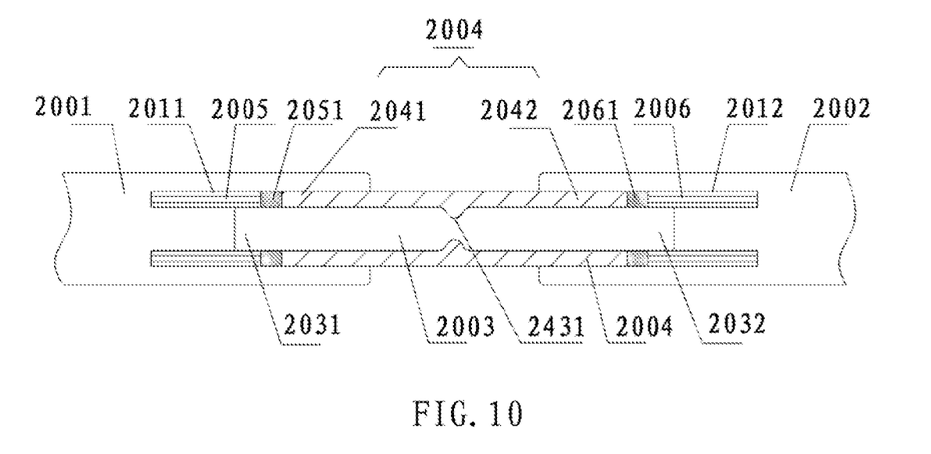
FIG. 10 is a partial sectional structural schematic view of an electronic apparatus having a connecting device according to the present disclosure when being opened.
Figure 11:
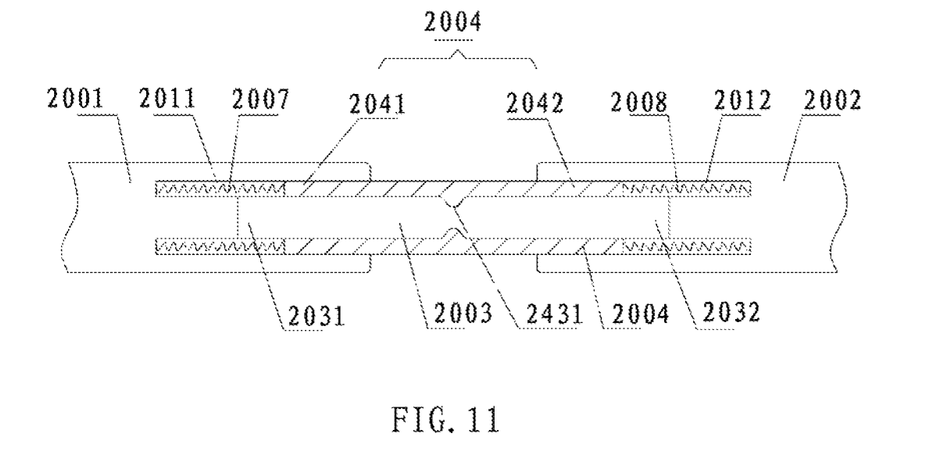
FIG. 11 is a partial sectional structural schematic view of an electronic apparatus having a connecting device according to the present disclosure when being opened.
Figure 12:
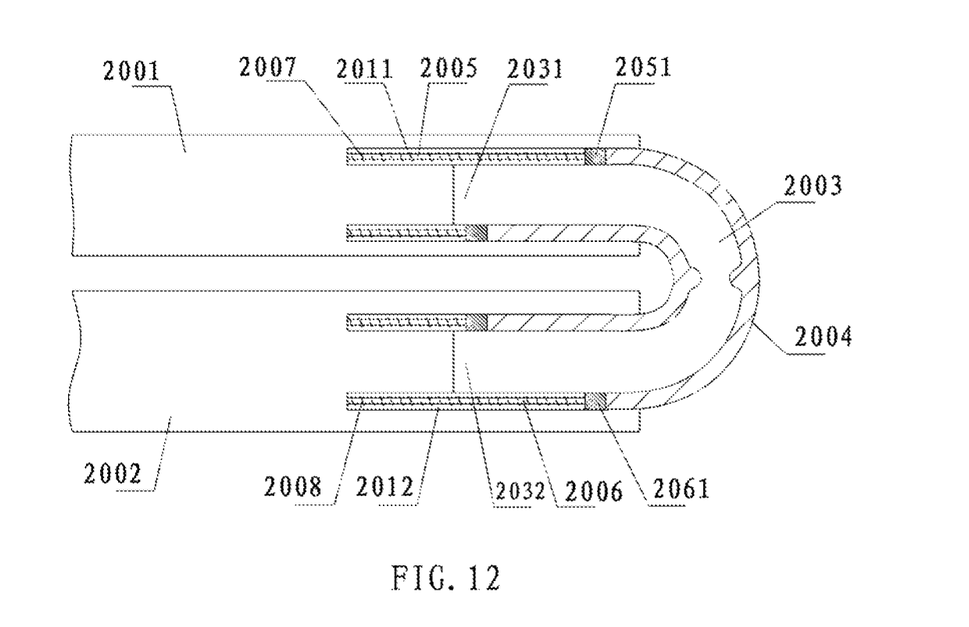
FIG. 12 is a partial sectional structural schematic view of an electronic apparatus having a connecting device according to the present disclosure when being closed.
Figure 13:
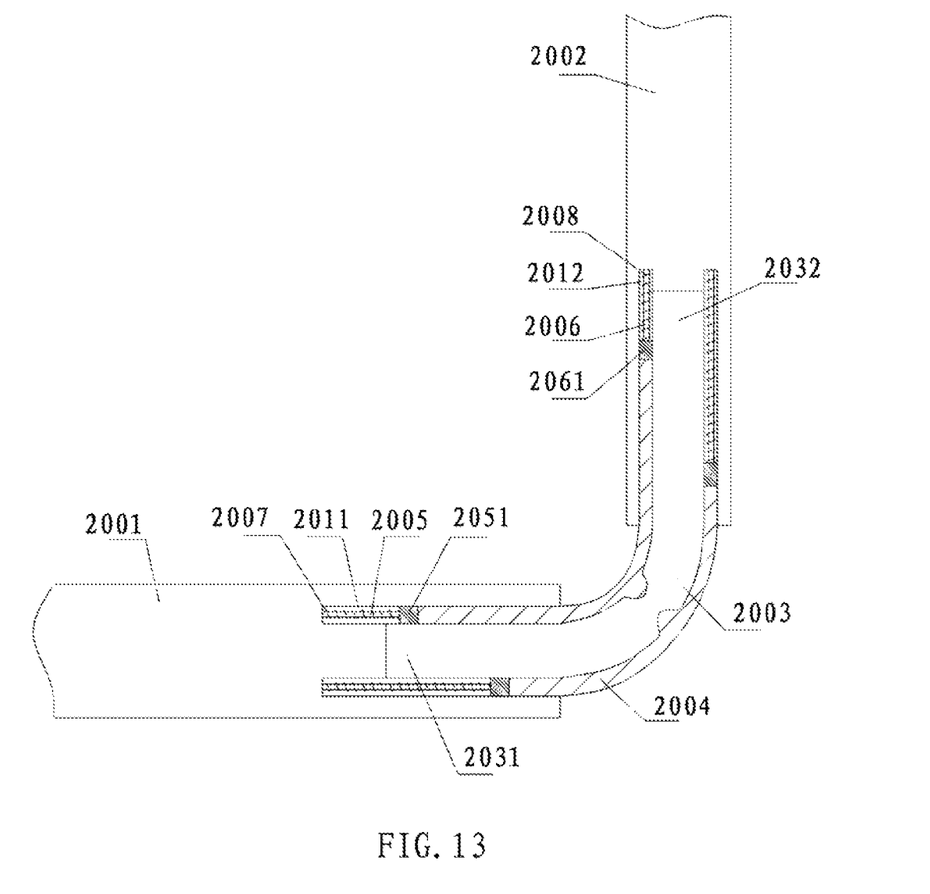
FIG. 13 is a partial sectional structural schematic view of an electronic apparatus having a connecting device according to the present disclosure wherein the first body and the second body form an intersection angle of 90°.
Figure 14:
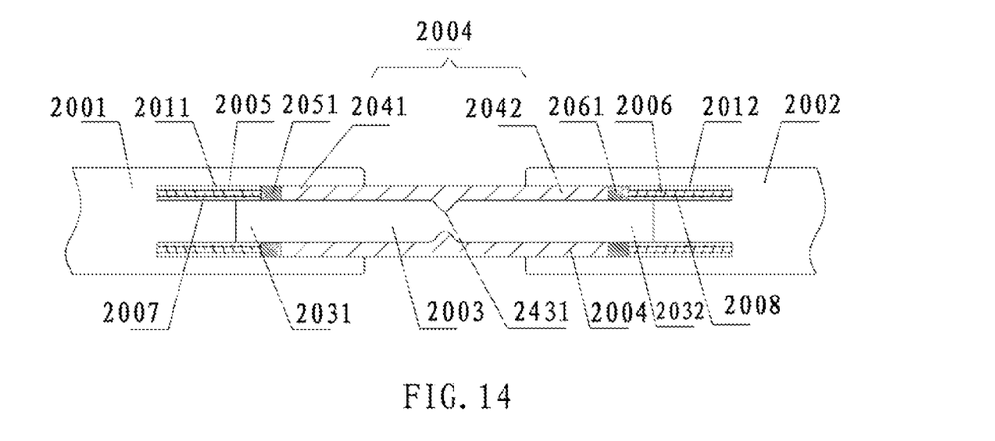
FIG. 14 is a partial sectional structural schematic view of an electronic apparatus having a connecting device according to the present disclosure wherein the first body and the second body form an intersection angle of 180°.
Figure 15:
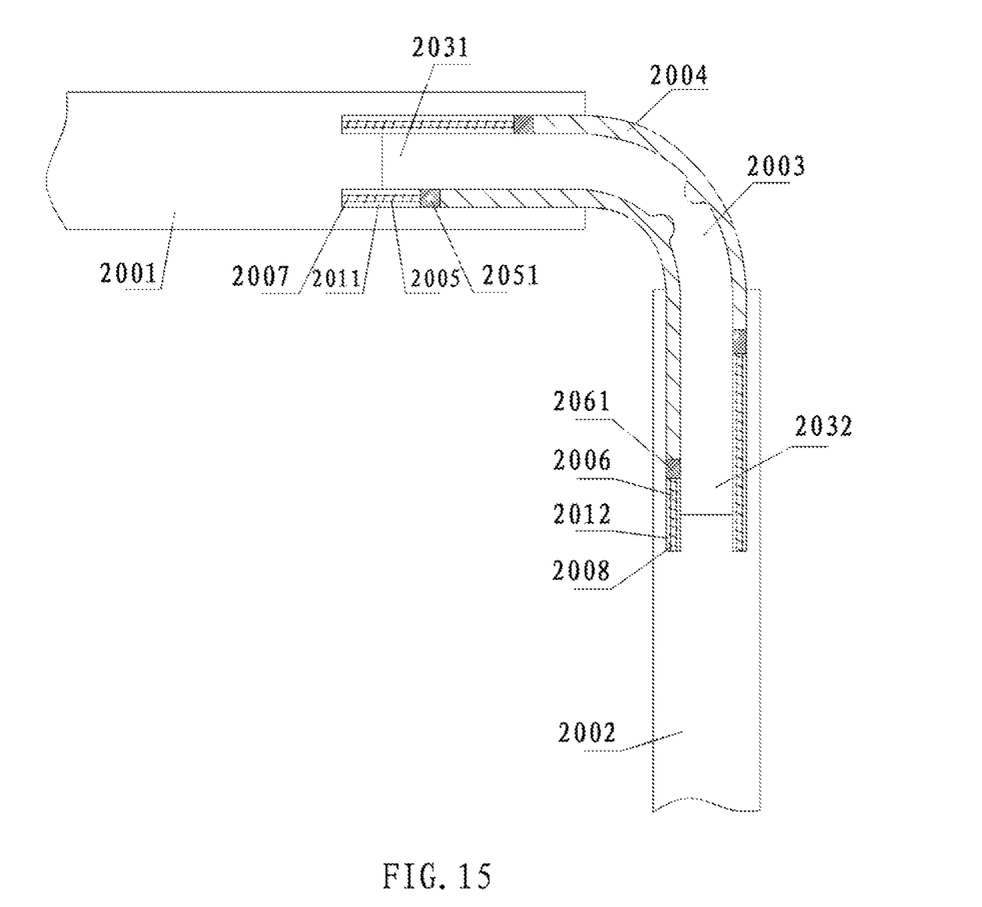
FIG. 15 is a partial sectional structural schematic view of an electronic apparatus having a connecting device according to the present disclosure wherein the first body and the second body form an intersection angle of 270°.
Figure 16:
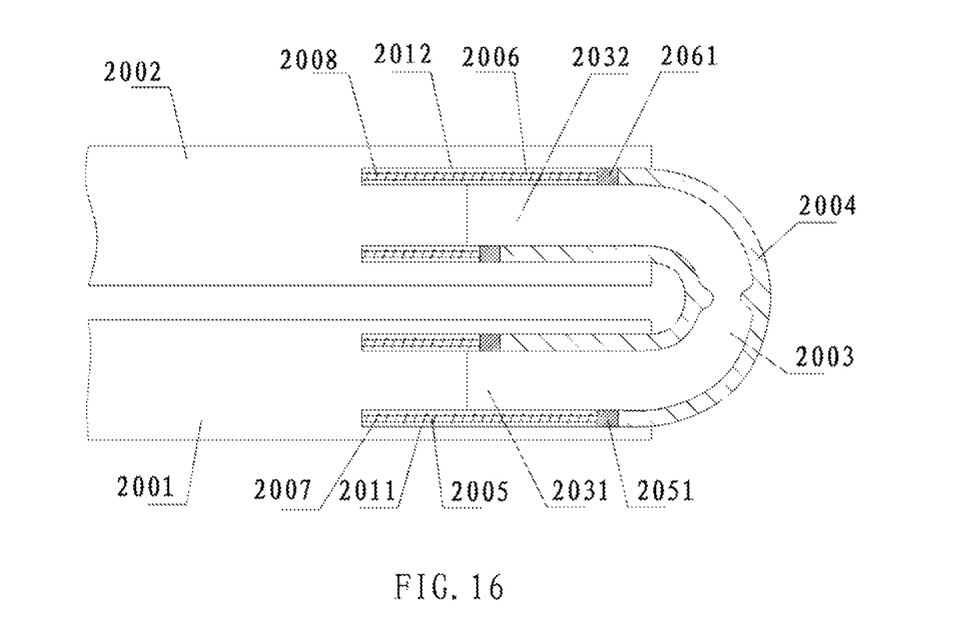
FIG. 16 is a partial sectional structural schematic view of an electronic apparatus having a connecting device according to the present disclosure wherein the first body and the second body form an intersection angle of 360°.

As shown in FIG. 9, the second embodiment of the present disclosure submits a connecting device for connecting a first body 2001 and a second body 2002 of an electronic apparatus, the first body 2001 and the second body 2002 of the electronic apparatus may be turned over through a rotating mechanism. For instance, when the electronic apparatus is a laptop computer, the first body 2001 may be the host computer part of the laptop computer, the second body 2002 may be the display part of the laptop computer, the display part and host computer part may be opened and closed through the rotating mechanism (i.e., the aforementioned turn over).

As shown in FIG. 9, the rotating mechanism provided by the embodiment of present disclosure comprises a rotation shaft body 2003 and an enclosing piece 2004. The rotation shaft body 2003 comprises a first end 2031 and a second end 2032 opposite to the first end 2031, the term "opposite to" means herein that the direction of first end 2031 and the direction of second end 2032 are opposite, for example, when the first end 2031 is the left end of the rotation shaft body, the second end 2032 is the right end of the rotation shaft body, or vice versa, when the first end 2031 is the right end of the rotation shaft body 2003, the second end 2032 is the left end of the rotation shaft body 2003. Wherein the first end 2031 may be connected with the first body 2001 of the electronic apparatus, the second end 2032 may be connected with the second body 2002 of the electronic apparatus, thus the first body 2001, the rotation shaft body 2003 and the second body 2002 may form an unity, and the first body 2001 and the second body 2002 may be turned over through the rotation shaft body.

The above rotation shaft body 2003 has a side for connecting the end face of the first end 2031 and the end face of the second end 2032.

At least a part of the side is enclosed with the aforementioned enclosing piece 2004, which provides such a technological effect that the part of a side of the rotation shaft body 2003 enclosed by the enclosing piece 2004 has a continual appearance surface, thereby effectively preventing impurities, such as dust and the like, from entering the rotating mechanism, thus the electronic apparatus having this rotating mechanism could work with optimal stability.

In above embodiment, the enclosing piece 2004 is a resilient enclosing piece and has a third end 2041 and a fourth end 2042 opposite to the third end 2041, the word "opposite" herein means that the third end 2041 and the fourth end 2042 have opposite directions, for example, when the third end 2041 is the left end of the enclosing piece 2004, the fourth end 2042 is the right end of the enclosing piece 2004; and vice versa, when the third end 2041 is the right end of the enclosing piece 2004, the fourth end 2042 is the left end of the enclosing piece 2004. Wherein the third end 2041 is retractably inserted into the first body 2001, and/or the fourth end 2042 is retractably inserted into the second body 2002. Specifically, in this embodiment, the third end 2041 and the fourth end 2042 of the enclosing piece 2004 have three particular embodiments: (1) only the third end 2041 is retractably inserted into the first body 2001, and the first body 2001 is provided with a space therein for freedom extension and contraction of the third end 2041; (2) only the fourth end 2042 is retractably inserted into the second body 2002, the second body 2002 is provided with a space therein for freedom extension and contraction of the fourth end 2042; (3) as shown in FIG. 9, the third end 2041 is retractably inserted into the first body 2001, and the fourth end 2042 is retractably inserted into the second body 2002, each of the first body 2001 and the second body 2002 is provided with a space for freedom extension and contraction of corresponding one end of the enclosing piece 2004.

In the technical solution provided by the embodiment of present disclosure, with the provision of the resilient enclosing piece 2004, the third end 2041 of the enclosing piece 2004 is retractably inserted into the first body 2001, and/or the fourth end 2042 of the enclosing piece 2004 is retractably inserted into the second body 2002, thereby both ends of the enclosing piece 2004 may be a freely retractable end, when the enclosing piece 2004 is bent to compressed, the material of the third end 2041 and the fourth end 2042 is subjected to crimping so as to shift toward the inner of the first body 2001 or the second body 2002, thus reducing material overlap upon the enclosing piece 2004 and then the enclosing piece 2004 being unlikely to occur rig marks or crumples during the turnover process; in addition, the enclosing piece 2004 experiences less stress during the turnover process, having a longer service life.

In a specific implementation, as shown in FIG. 9, the aforementioned rotation shaft body 2003 may be enclosed with enclosing piece 2004 at both two opposite sides. In one alternate embodiment, the rotation shaft body 2003 may be enclosed with enclosing piece 2004 at all four visible sides, thereby the rotation shaft body 2003 is received in the enclosing piece 2004, the rotation shaft body 2003 is invisible in its appearance on a whole, which brings such an effect that the rotating mechanism is more simple in its appearance when seen from its entirety.

In a specific implementation, as shown in FIGS. 9-17, to enclose the aforementioned enclosing piece 2004 onto the side of the rotation shaft body 2003, the present disclosure provides embodiments as follows: the aforementioned enclosing piece 2004 may be provided with bumps 2431, the side of the rotation shaft body 2003 is provided with recess at corresponding positions (not shown). The enclosing piece 2004 is inserted into the recess through the bumps 2431 and is snapped with and attached to the rotation shaft body 2003, which brings such an effect that the structure is simple and its assembly is convenient. Further, the bumps 2431 of this embodiment are overfitted with the side wall of the recess, such that the enclosing piece 2004 can achieve detachable connection with the rotation shaft body 2003, here the word "detachable" means that the enclosing piece 2004 and the rotation shaft body 2003 not only may be assembled and attached, but also may be detachably separated. In a specific implementation, the enclosing piece 2004 is inserted into recess of the rotation shaft body 2003 through the bumps 2431 and is assembled and attached with the rotation shaft body 2003, when a greater force is applied to the enclosing piece 2004, the frictional resistance between the enclosing piece 2004 and the side wall of the recess can be overcome, thereby the bumps 2431 of the enclosing piece 2004 may be pulled out of the recess, obtaining the technical effect of detaching the enclosing piece 2004 and the rotation shaft body 2003 from each other. However, in one alternate embodiment, the position of the bump 2431 and recess of the above embodiment can be exchanged; in other words, the rotation shaft body 2003 may be provided with bumps 2431, while the enclosing piece 2004 may be provided with recess at corresponding positions.

Furthermore, it will be appreciated from the above description that the aforementioned bump 2431 and recess may be plurality and corresponding to each other in an one-to-one manner, thus bringing such an effect that a plurality of bumps 2431 are inserted into a plurality of recess respectively, the connection between the enclosing piece 2004 and the rotation shaft body 2003 is even more stable and is unlikely to be detached, comparing with the above situation in which only one bump 2431 is used by the enclosing piece 2004 to snap with and attach to the rotation shaft body 2003.

In a specific implementation, the rotation shaft body 2003 of the rotating mechanism provided by the embodiment of present disclosure may be realized in the following manners. The rotation shaft body 2003 may have a rotation shaft (not shown) and a shaft seat (not shown), the first body 2001 is provided with a rotation shaft, and the second body 2002 is provided with a shaft seat, the shaft seat is provided with a shaft hole matching with the rotation shaft, when the rotation shaft of the first body 2001 is assembled to the shaft seat of the second body 2002, the first body 2001 and the second body 2002 may rotate with respect to each other through this rotation shaft. However, in one alternate embodiment, the position of the above rotation shaft and shaft seat can be exchanged. In this alternate embodiment, the first body 2001 may be provided with a shaft seat, the second body 2002 may be provided with a rotation shaft matching with the shaft seat at correspondent position, in this way, it can obtain the technical effect that the first body 2001 and the second body are in a rotatable connection with each other. However, in a further alternate embodiment, the rotation shaft body 2003 may also be a flexible connecting piece (not shown) with one end of the flexible connecting piece connected with the first body 2001 and another end connected with the second body 2002, the first body 2001 may be in rotatable connection with the second body 2002 through such a flexible connecting piece. Wherein the flexible connecting piece may be a resilient plastic rubber piece, an aluminum piece, a copper piece, or chemical compounds having resilience characters etc., and can be set as required by the user.

As shown in FIGS. 9-17, the embodiment of the present disclosure also provides an electronic apparatus having a first body 2001, a second body 2002 and a rotating mechanism. The rotating mechanism comprises a rotation shaft body 2003 and an enclosing piece 2004, the rotation shaft body 2003 comprises a first end 2031 and a second end 2032 opposite to the first end 2031; the rotation shaft body 2003 has a side connecting with the end face of the first end 2031 and the end face of the second end 2032; and at least a part of the side of the rotation shaft body 2003 is enclosed with the enclosing piece 2004. Here the enclosing piece 2004 is a resilient enclosing piece, and has a third end 2041 and a fourth end 2042 opposite to the third end 2041.

To be specified, the rotating mechanism concerned in the present embodiments may be the rotating mechanism as described in above embodiment, reference can be made to corresponding contents of the above embodiment for detailed implementation and operating principle, repeated description is omitted here.

In this embodiment, the first body 2001 is connected with the first end 2031, the second body 2002 is connected with the second end 2032, and the first body 2001 and the second body 2002 turn over through the rotating mechanism. The aforesaid third end 2041 is retractably inserted into the first body 2001, and/or the fourth end 2042 is retractably inserted into the second body 2002.

From the above description, to enable the aforesaid third end 2041 be retractably inserted into the first body 2001 while the fourth end 2042 be retractably inserted into the second body 2002, the embodiment of present disclosure also provides embodiments as follows: as shown in FIGS. 9-17, the aforesaid first body 2001 may be provided with a first limiting groove 2011, and the second body 2002 may be provided with a second limiting groove 2012. The third end 2041 is inserted into the first limiting groove 2011, and is slidable along the first limiting groove 2011; the first limiting groove 2011 may put constraint upon the freedom of the third end 2041, so that the third end 2041 can only slide along the track defined by the first limiting groove 2011. The fourth end 2042 is inserted into the second limiting groove 2012, and is slidable along the second limiting groove 2012, the second limiting groove 2012 may put constraint upon the freedom of the fourth end 2042, so that the fourth end 2042 can only slide along the track defined by the second limiting groove 2012. With the above arrangement, such a technical effect may be presented: the third end 2041 and the fourth end 2042 can only slide within a preset range, thus preventing them from interfering the operation of other parts in the rotating mechanism; additionally, due to the fact that the third end 2041 and the fourth end 2042 of the enclosing piece 2004 are both inserted into the rotating mechanism, specific structures at the side of the rotation shaft body 2003 being enclosed may be shielded entirely, in such a way that the rotating mechanism looks even more simply in its appearance.

From the above description, furthermore, as shown in FIGS. 10, 12-15, the aforesaid first limiting groove 2011 and second limiting groove 2012 may be provided with guide rails therein. The guide rails in the first limiting groove 2011 and the second limiting groove 2012 may be provided in various ways, for example, only the first limiting groove 2011 is provided with the guide rail therein; or only the second limiting groove 2012 is provided with the guide rail therein; or alternatively, both the first limiting groove 2011 and the second limiting groove 2012 are provided with guide rails therein. Here, specific embodiments are described as follows:

Firstly, the first limiting groove 2011 is provided with a first guide rail 2005 therein, and the third end 2041 is connected with a slider block 2051 of the first guide rail 2005. In a specific implementation, the first guide rail 2005 may be a straight guide rail, the third end 2041 is fixedly connected to the slider block 2051 of the first guide rail 2005, for example, by screw fixation etc. The first guide rail 2005 may guide the third end 2041, so that the third end 2041 could slide along the defined track; and in addition, due to the fact that the first guide rail 2005 has less frictional resistance, when the third end 2041 slides in the first limiting groove 2011 through the first guide rail 2005, the occurred frictional resistance is also less, thereby the third end 2041 has weaker abrasion and longer service life.

Secondly, the second limiting groove 2012 is provided with a second guide rail 2006 therein, and the fourth end 2042 is connected with the slider block 2061 of the second guide rail 2006. In this embodiment, specific implementation and operating principle for the second guide rail 2006 may be found in corresponding description with respect to the first guide rail 2005 in above embodiment, repeated description thereof is omitted herein.

Thirdly, as shown in FIGS. 10, 12-16, the first limiting groove 2011 is provided with the first guide rail 2005 therein, the third end 2041 is connected with the slider block 2051 of the first guide rail 2005; and the second limiting groove 2012 is provided with the second guide rail 2006 therein, the fourth end 2042 is connected with the slider block 2061 of the second guide rail 2006. With the arrangement of this embodiment, such an technical effect may be achieved that both ends of the enclosing piece 2004 are slidable in the limiting groove through guide rails, and both ends of the enclosing piece 2004 experience less friction force when sliding, thereby the enclosing piece 2004 is subjected to less rubbing abrasion on its whole, thus having a longer service life.

However in one alternate embodiment, the aforesaid first guide rail 2005 and second guide rail 2006 may also be replaced with other pilot structures, such as, pilot pin, dovetail groove or other pilot structures. The skilled in this art should understand that the first guide rail 2005 and the second guide rail 2006 are given by way of example only, and do not intend to limit the technical solution of the embodiment of present disclosure, other types of pilot structure may also be available.

In a specific implementation, as shown in FIGS. 11-16, the aforesaid first limiting groove 2011 and second limiting groove 2012 may be provided with elastic elements therein, the elastic elements in the first limiting groove 2011 and the second limiting groove 2012 may be provided in various ways, for example, only the first limiting groove 2011 is provided with the elastic element therein; or only the second limiting groove 2012 is provided with the elastic element therein; or alternatively, both the first limiting groove 2011 and the second limiting groove 2012 are provided with elastic elements therein. Here, specific embodiments are described as follows:

Firstly, the aforesaid first limiting groove 2011 may be provided with a first elastic element 2007 therein, one end of the first elastic element 2007 being connected with the third end 2041 and another end being connected with the bottom face of the first limiting groove 2011, the first elastic element 2007 is configured to be the one providing stretching force for the third end 2041. In this embodiment, the first elastic element 2007 could always apply a stretching force upon the third end 2041 in such a way that, when the enclosing piece 2004 is bent to be compressed, the material of the third end 2041 shifts outward under such a stretching force, thereby further reducing material overlap on the enclosing piece 2004 and then depressing the occurrence of rig marks and crumples of the enclosing piece 2004 during the turn over process.

Secondly, the aforesaid second limiting groove 2012 is provided with a second elastic element 2008 therein, one end of the second elastic element 2008 is connected with the fourth end 2042, and the other end of the second elastic element 2008 is connected with the bottom face of the second limiting groove 2012, the second elastic element 2008 is configured to be the one providing a stretching force for the fourth end 2042. In this embodiment, the arrangement of the second elastic element 2008 is substantially the same as that of the first elastic element 2007, specific implementation and operating principle may refer to corresponding contents about the first elastic element 2007 of the above embodiment, repeated description thereof is omitted here.

Thirdly, as shown in FIGS. 11-16, the aforesaid first limiting groove 2011 may be provided with a first elastic element 2007 therein, one end of the first elastic element 2007 being connected with the third end 2041 and another end being connected with the bottom face of the first limiting groove 2011, the first elastic element 2007 is configured to be the one providing stretching force for the third end 2041. Also, the aforesaid second limiting groove 2012 is provided with a second elastic element 2008 therein, one end of the second elastic element 2008 is connected with the fourth end 2042, and the other end of the second elastic element 2008 is connected with the bottom face of the second limiting groove 2012, the second elastic element 2008 is configured to be the one providing a stretching force for the fourth end 2042. With the configuration of the present embodiment, it can obtain such a technical effect that both the third end 2041 and fourth end 2042 of the enclosing piece 2004 are subjected to an outward stretching force, when the enclosing piece 2004 is bent to be compressed, the material of the third end 2041 and the fourth end 2042 both shifts outward under such a stretching force, thereby further reducing material overlap on the enclosing piece 2004 and then depressing the occurrence of rig marks and crumples of the enclosing piece 2004 during the turn over process.

From the above description, the aforesaid first element 2007 and second elastic element 2008 are respectively optional one of the extension spring and rubber band. Here the extension spring (also referred as tension spring, for short, drag spring) is a helical spring received an axial tensile force, the extension spring is generally made from materials having circular section. When no burden is received, the turns of one extension spring are always adjacent with each other without any gap there between. The formal name for the rubber band is latex rubber ring or latex bonding tape, the rubber band is made from latex through immersion method, having characteristics such as greater tensibility, better resiliency, lower cost, usableness and the like.

Figure 17:
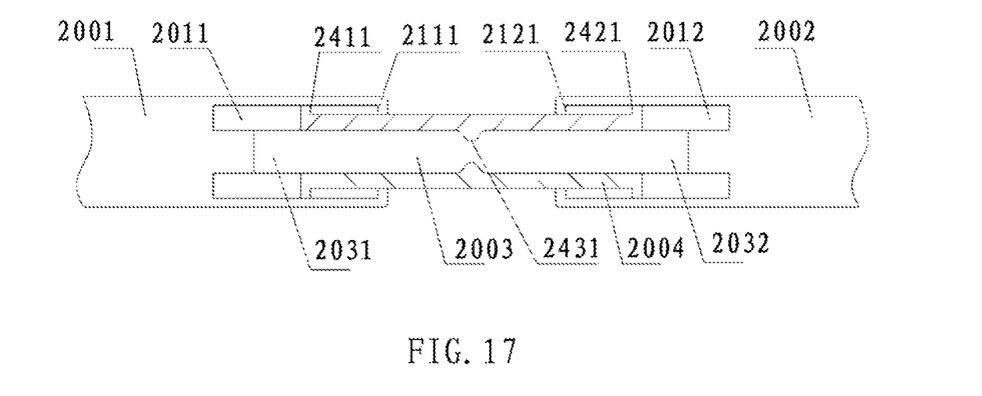
FIG. 17 is a partial sectional structural schematic view of an electronic apparatus having a connecting device according to the present disclosure when being opened.

In a specific implementation, as shown in FIG. 17, the aforesaid first limiting groove 2011 may be provided with a first stopper 2111 at its opening, the third end 2041 is provided with a first snapping stage 2411, and the first stopper 2111 is used to contact against the first snapping stage 2411 and prevent the third end 2041 from sliding out of the opening of the first limiting groove 2011. The second limiting groove 2012 is provided with a second stopper 2121 at its opening, the fourth end 2042 is provided with a second snapping stage 2421, and the second stopper 2121 is used to contact against the second snapping stage 2421 and prevent the fourth end 2042 from sliding out of the opening of the second limiting groove 2012. Here the first stopper 2111 may be orthogonal to the side wall of the first limiting groove 2011, and the second stopper 2121 may be orthogonal to the side wall of the second limiting groove 2012. In this embodiment, by the provision of the first stopper 2111 and the second stopper 2121, it is possible to effectively prevent both ends of the enclosing piece 2004 from sliding out of the first body 2001 and the second body 2002, thus influencing esthetic appearance.

In a specific implementation, the electronic apparatus provided by the embodiment of present disclosure may be a laptop computer or a flip phone and the like, for instance, when the electronic apparatus provided by the embodiment of present disclosure is a laptop computer, the first body 2001 may be the host computer part of the laptop computer, the second body 2002 may be the display part of the laptop computer. The skilled in this art should appreciate that the laptop computer or flip phone are given by way of example only, and do not intend to limit the technical solution provided by the embodiment of present disclosure, other types of electronic apparatus may also be available.

According to the above embodiments, the rotating mechanism and/or electronic apparatus provided by the embodiment of present disclosure has(have) at least the following advantages:

By providing an enclosing piece 2004 in the technical solution of the present disclosure, at least a part of the side of the rotation shaft body is enclosed with the enclosing piece 2004, the enclosing piece 2004 enables the side of the rotation shaft body 2003 have a continual appearance surface, thereby effectively preventing impurities, such as dust and the like, from entering the rotating mechanism, thus the electronic apparatus having this rotating mechanism could work with optimal stability.

The above provides detail introduction of the present disclosure, and the variations made by the skilled in this art based on the idea of the embodiment of present disclosure about particular embodiments and the range of application should not be construed as departing from the protective scope of the present disclosure, generally speaking, the content of this specification should not be regarded as limiting to the present disclosure.

The invention claimed is:

1. A connecting device comprising:
   a first body and a second body;
   a rotating mechanism configured to rotatably connect the first body and the second body together;
   an enclosing mechanism configured to enclose and cover at least a part of the rotating mechanism, wherein the enclosing mechanism includes two pockets, the opposite end faces thereof being open, the enclosing mechanism fitting over an outer side of the rotating mechanism, and the enclosing mechanism connected between the first body and the second body respectively, such that a degree of tightness of the enclosing mechanism varies with the rotation of the first body and the second body with respect to each other via the rotation of the rotating mechanism; and
   two covers to attach the enclosing mechanism onto the first body and the second body, each cover shaped as a cuboid and arranged such that opposite end faces are open, each cover being are fitted over a respective open end face of the enclosing mechanism;
   wherein each cover, the enclosing mechanism, and the rotating mechanism are provided with corresponding screw holes and the enclosing mechanism and the rotating mechanism are attached together by threading screw elements into the screw holes.

2. The connecting device according to claim 1, wherein the enclosing mechanism comprises a first enclosing piece enclosing a first side of the rotating mechanism.

3. The connecting device according to claim 2, wherein when the connecting device is in the first state, the first enclosing piece has a first tightness degree, and when the connecting device is in the second state, the first enclosing piece has a second tightness degree, the first tightness degree being looser than the second tightness degree.

4. The connecting device according to claim 3, wherein the enclosing mechanism further comprises a second enclosing piece enclosing a second side of the rotating mechanism.

5. The connecting device according to claim 4, wherein when the connecting device is in the first state, the second enclosing piece has a third tightness degree, and when the connecting device is in the second state, the second enclosing piece has a fourth tightness degree, the third tightness degree being tighter than the fourth tightness degree.

6. The connecting device according to claim 1, wherein the enclosing mechanism is prestretched to have a preset tightness degree before the enclosing mechanism is attached to the first body and second body.

7. The connecting device according to claim 1, wherein the material for the enclosing mechanism is silica gel.

8. The connecting device according to claim 1, wherein the inner side of the cover is provided with cover raised strips extending along its entire longitudinal direction; or the outer side of the enclosing mechanism is provided with enclosing mechanism raised strips extending along its entire longitudinal direction, and the inner side of the cover is provided with a cover recess cooperating with the enclosing mechanism raised strips, and/or the outer side of the enclosing mechanism is provided with a enclosing mechanism recess extending along its entire longitudinal direction and the inner side of the cover is provided with cover raised strips cooperating with the enclosing mechanism recess; the raised strips and/or the recess are used to press the enclosing mechanism onto the rotating mechanism while forcing the enclosing mechanism evenly.

9. The connecting device according to claim 1, wherein the rotating mechanism is a multi-spindle rotating mechanism having a plurality of connection taps protruding outward in the radial direction of the spindles, the screw holes of the rotating mechanism are provided on the connection taps, and the connection taps of the rotating mechanism are also used for connecting the first body and the second body in addition to connecting the rotating mechanism to the enclosing mechanism and the covers, in such a way that the enclosing mechanism is attached to the first body and the second body.

10. The connecting device according to claim 1, wherein the rotating mechanism comprises:
    a rotation shaft body having a first end for connection with the first body and a second end opposite to the first end for connection with the second body; the rotation shaft body comprises a side for connecting the end face of the first end and the end face of the second end;
    the enclosing mechanism comprises an enclosing piece, at least a part of the side is enclosed with the enclosing piece; the piece is a resilient enclosing piece having a third end and a fourth end opposite to the third end, the third end is retractably inserted into the first body, and/or the fourth end is retractably inserted into the second body.

11. The connecting device according to claim 10, wherein, the the side is provided with a recess; and
    the enclosing piece is inserted into the recess through the bumps and is snapped with and attached to the rotation shaft body.

12. An electronic apparatus having the first body and the second body according to claim 1, wherein the rotating mechanism comprises:
    a rotation shaft body having a first end for connection with the first body and a second end opposite to the first end for connection with the second body; the rotation shaft body comprises a side for connecting the end face of the first end and the end face of the second end;
    the enclosing mechanism comprises an enclosing piece, at least a part of the side is enclosed with the enclosing piece; the piece is a resilient enclosing piece having a third end and a fourth end opposite to the third end, the third end is retractably inserted into the first body, and/or the fourth end is retractably inserted into the second body; and the first body is connected with the first end of the rotating mechanism;

the second body is connected with the second end of the rotating mechanism;

the first body and second body are rotated with respect to each other via the rotating mechanism.

13. The electronic apparatus according to claim 12, wherein, the first body is provided with a first limiting groove;

the second body is provided with a second limiting groove;

the third end is inserted into the first limiting groove, and is slidable with respect to the wall of the first limiting groove;

the fourth end is inserted into the second limiting groove, and is slidable with respect to the wall of the second limiting groove.

14. The electronic apparatus according to claim 13, wherein, the first limiting groove is provided with a first guide rail therein, and the third end is connected with a slider block of the first guide rail;

and/or the second limiting groove is provided with a second guide rail therein, and the fourth end is connected with a slider block of the second guide rail.

15. The electronic apparatus according to claim 13, wherein, the first limiting groove is provided with a first elastic element therein, one end of the first elastic element is connected with the third end, and the other end of the first elastic element is connected with the bottom face of the first limiting groove; and/or the second limiting groove is provided with a second elastic element therein, one end of the second elastic element is connected with the fourth end, and the other end of the second elastic element is connected with the bottom face of the second limiting groove.

16. The electronic apparatus according to claim 15, wherein, the first elastic element and the second elastic element are respectively optional one of the extension spring and rubber band.

17. The electronic apparatus according to claim 13, wherein, the first limiting groove is provided with a first stopper at its opening, the third end is provided with a first snapping stage, and the first stopper is used to contact against the first snapping stage and prevent the third end from sliding out of the opening of the first limiting groove;

the second limiting groove is provided with a second stopper at its opening, the fourth end is provided with a second snapping stage, and the second stopper is used to contact against the second snapping stage and prevent the fourth end from sliding out of the opening of the second limiting groove.

18. The electronic apparatus according to claim 12, wherein the electronic apparatus is a laptop computer or a flip phone.

* * * * *